United States Patent Office 3,754,049
Patented Aug. 21, 1973

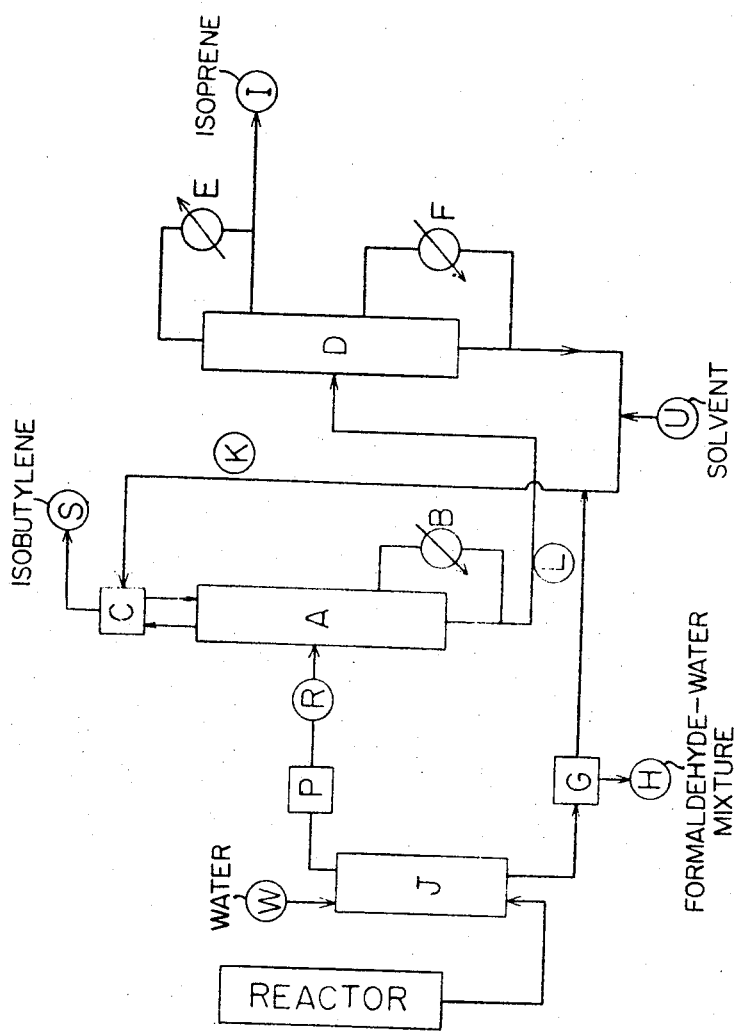

3,754,049
METHOD FOR PURIFICATION OF ISOPRENE
Katsuhiko Ogino, and Masahiro Inoue, Osaka, Japan, assignors to Takeda Chemical Industries, Ltd., Osaka, Japan
Filed Feb. 4, 1971, Ser. No. 112,736
Claims priority, application Japan, Feb. 4, 1970, 45/9,817
Int. Cl. C07c 7/08
U.S. Cl. 260—681.5 R  9 Claims

ABSTRACT OF THE DISCLOSURE

Isoprene reaction mixture obtained by reacting isobutylene and formaldehyde in presence of acid catalyst is purified to recover isoprene by contacting reaction mixture with water to remove unreacted formaldehyde, contacting resultant reaction mixture with an oily substance, obtained by eliminating water, isobutylene, formaldehyde and isoprene from the reaction mixture, in a first distillation column to remove unreacted isobutylene and subjecting the resultant reaction mixture containing isoprene and an oily substance to distillation in a second column, whereby isoprene is recovered as distillate. The oily substance thus separated from the isoprene can be recycled to the first distillation column.

---

The present invention is concerned with a method for purification of isoprene, more particularly a method for recovering isoprene in a pure state from a reaction mixture of isobutylene and formaldehyde.

Isoprene is a valuable starting material for the production of synthetic rubbers, etc. and has recently increased in importance.

There has already been proposed a method for production of isoprene by a direct reaction of isobutylene and formaldehyde using a solid acid catalyst, and many kinds of solid acid catalysts have been developed for this purpose In the known method, it is required to use isobutylene in quite a large amount relative to formaldehyde, e.g. a ratio of isobutylene/formaldehyde of at least 4 to 5/1 (mole/mole), and therefore the reaction mixture contains a large amount of unreacted isobutylene and the content of the desired isoprene therein is remarkably low such as several to ten percent. Thus, one of the most important and serious problems in the known methods is how to recover the desired isoprene from the reaction mixture in a high yield.

For the purpose of separating and recovering isoprene from the reaction mixture, a fractional distillation may be utilized. However, since isoprene and isobutylene have rather low boiling points, the distillation should be conducted under considerably elevated pressure such as 4 to 5 kg./cm.$^2$G or higher. Needless to say, the distillation under such high pressure as above necessarily requires high cost, many steps of troublesome procedures and a large and complicated apparatus. Further, this distillation under high pressure is accompanied by the following drawback. Namely, as the reaction itself of isobutylene and formaldehyde is conducted under normal pressure, the reaction mixture should be transferred by force from a system under normal pressure to a system under highly elevated pressure for its separation, and in order to conduct this forced transfer, it is unavoidable to utilize supplemental apparatuses, process steps and energy.

In view of the foregoing it is well understood that the recovery of isoprene by fractional distillation under elevated pressure is undesirable from an industrial point of view. It is also conceivable to recover the desired isoprene from the reaction mixture by distillation under cooling instead of distillation under elevated pressure. For this purpose however it is essential that the system be kept cooled to a temperature lower and —5° C., for recovering isoprene in a good yield, and cooling to such low temperature as just above also requires supplemental apparatuses, process steps and energy, at least when this process is conducted on an industrial scale. Thus, also the recovery of isoprene by distillation under cooling is undesirable from an industrial point of view.

Under the circumstances, it has been a desideratum to provide a method for separating and recovering isoprene from a reaction mixture of isobutylene and formaldehyde at a high yield by a simple procedure utilizing a simple apparatus without requiring elevated pressure nor cooling to such a low temperature as above.

On the other hand, when isobutylene is directly reacted with formaldehyde after known manners using solid acid catalysts, a considerable amount of an oily substance is unavoidably by-produced, whatever solid acid catalyst may be used or whatever reaction conditions may be selected. The by-produced oily substance has been regarded as useless in industrial fields, and thus the oily substance has been discarded without putting it to any further use. Therefore, effective utilization of this oily substance is industrially very desirable.

Taking the state of art as mentioned above into consideration, the present inventors have made extensive studies for providing a method for recovering isoprene from a reaction mixture of isobutylene and formaldehyde, which is not accompanied by the afore-mentioned drawbacks of the known methods, and also for finding out an effective utilization of the oily substance by-produced in the reaction, and have arrived at such unexpected findings as described below:

The oily substance itself by-produced in the reaction of isobutylene and formaldehyde can be utilized for separation and recovery of the desired isoprene from the reaction mixture; when the reaction mixture of isobutylene and formaldehyde is subjected to distillation using the oily substance, the desired isoprene can effectively be separated and recovered at a high yield without requiring highly elevated pressure or without cooling the distillation column to a low temperature; and therefore utilization of the oily substance for recovering isoprene by means of distillation can, by a single effort, eliminate the difficulties hitherto encountered for recovery of isoprene from the reaction mixture of isobutylene and formaldehyde.

The present invention has been accomplished on the basis of these unexpected findings.

Thus, the principal and essential object of the present invention is to provide an industrially feasible method for separation and recovery of isoprene in a high yield from a reaction mixture of isobutylene and formaldehyde by a simple procedure and simple and conventional apparatus without requiring elevated pressure or without cooling the system to a low temperature.

The characteristic and essential features of the method of the present invention are that a reaction mixture of isobutylene and formaldehyde is allowed to contact with water to remove unreacted formaldehyde, and the resulting mixture is allowed to contact with an oil, which is by-produced in the reaction of isobutylene and formaldehyde, in a distillation column under conditions that the top of the column is kept at not higher than about 50° C. and the bottom of the column is kept at not lower than about 80° C. whereby the desired isoprene is recovered from the column bottom and isobutylene is recovered from the column top.

In the present method, a reaction mixture of isobutyleneand formaldehyde is used as the starting material. The reaction mixture is that prepared by reacting 1 mole part of formaldehyde with a large excess amount (e.g. about 4 to about 30 mole parts) of isobutylene under heating (e.g. at about 200 to about 400° C.) in the presence of a solid acid catalyst at a space velocity of about 5 to about 300 mole/liter catalyst-hour. Detailed procedures are described, for example, in U.S. Pats. 2,993,940, 2,997,509, 3,024,292; British Pats. Nos. 826,546, 863,330; Japanese patent publications Nos. 14,131/1960, 23,313/1961, 7,307/1962, 28,630/1964, 28,631/1964, etc. There have been known many kinds of the solid acid catalysts for this purpose and any of them may be used for the purpose of this invention. Typical examples of the solid acid catalysts are clay minerals (e.g. acid clay, kaolin, bentonite, montmorillonite, etc.), oxides (e.g. silica, alumina, zinc oxide, titanium oxide, etc.), compound oxides (e.g. those comprising one or more of silica, alumina, zinc oxide, titanium oxide, etc. and one or more of oxides of magnesium, calcium, strontium, barium, boron, yttrium, lead, phosphorus, arsenic, antimony, bismuth, chromium, cobalt, etc.), metal salts (e.g. sulfates, phosphates, halides, etc. of zinc, magnesium, calcium, manganese, nickel, copper, strontium, cadmium, aluminum, tin, chromium, iron cobalt, etc.), acids supported on carriers (e.g. sulfuric acid, phosphoric acid, etc. supported on alumina, silica, diatomaceous earth, activated clay, etc.), and the like.

In the present method, any of these reaction mixtures of isobutylene and formaldehyde, which are prepared by any of the per se known manners, can be used as the starting material, whatever kind of the catalyst or reaction conditions are used or applied.

The reaction mixture is at first treated with water, for example, by blowing the reaction mixture into water or by contacting, the reaction mixture with water co-currently or counter-currently. The treatment is conducted at about 0 to about 100° C. By this treatment, unreacted formaldehyde contained in the starting reaction mixture is dissolved in water and a part of the oily substance contained in the reaction mixture is condensed in water, while the reaction mixture free of formaldehyde is recovered as a gaseous material. The aqueous solution resulting from the above procedure, which contains formaldehyde and an oily substance, is kept standing, whereby the solution is easily separated into the upper layer and the lower layer, the former being an oily substance layer, and the latter being an aqueous layer containing formaldehyde. The oily substance layer is recovered and used in the subsequent process step of the present method, while the aqueous layer is subjected to a step for recovering formaldehyde.

The oily substance obtained above is a by-product(s) produced in the reaction of isobutylene and formaldehyde and shows the following properties:

(a) boiling point of about 90 to about 200° C.
(b) specific gravity of about 0.75 to about 0.85 (25° C.)
(c) the components of the substance being about 5 to about 80 weight percent of $C_8$ unsaturated hydrocarbons, about 5 to about 80 weight percent of $C_9$ unsaturated hydrocarbons, about 0 to about 50 weight percent of $C_{10}$ unsaturated hydrocarbons and other minor substances.

The properties of any of the oily substances by-produced by the reaction of isobutylene and formaldehyde fall within the range specified as above, whatever kind of catalysts or reaction conditions may be used or applied, though minor and substantially negligible variations are observed depending upon the kind of the catalyst and other reaction conditions employed, and any of these oily substances can be used for the purpose of the present invention to give a substantially equal result.

The gaseous material obtained in the preceding step and the above-specified oily substance are introduced into a distillation column in such a manner that the two substances are allowed to contact with each other in this column co-currently or counter-currently. A ratio of the oily substance to the gaseous material to be used is about 1/10 to about 3/1 (weight/weight).

During the contact of the two substances, the top of the distillation column is kept not higher than about 50° C., more desirably at a temperature ranging from room temperature to about 40° C., and the bottom of the column is kept not lower than about 80° C., more desirably about 80 to about 180° C. The distillation column is generally kept under normal pressure, but, if desired, the pressure may be increased up to about 2 to about 3 kg./cm.$^2$ G. The distillation column employable may be any of conventional ones such as various packed columns, bubble cap column, porous plate column, tunnel cap tray, ballast tray, flexi and jet tray.

By this process step, unreacted isobutylene is recovered from the column top in a gaseous state, while the isoprene component is recovered as a high boiler from the column bottom. The isoprene component is still contaminated with the oily substance by-produced by the reaction of isobutylene and formaldehyde, though a part of the oily substance is already removed by the foregoing water-treatment. As the boiling point of the oily substance is much higher than that of isoprene, the isoprene component contaminated with the oily substance can easily be separated into the respective components from each other by a conventional distillation.

By the distillation of this step, the desired isoprene is recovered from the top of the distillation column, while the oily substance is recovered as a high boiler from the bottom of the column, and thus recovered oily substance is recycled to the preceding distillation step. The oily substance separated at this stage shows substantially the same properties as those of the oily substance obtained in the foregoing step.

The above described process steps can be conducted continuously.

At the initial stage of this series of process steps, only a small amount of the oily substance is recovered from the water-treatment step. Therefore, it is recommended that, at the initial stage, an organic solvent is introduced, solely or together with the oily substance into the distillation column for allowing the same to contact with the gaseous reaction mixture from the water-treatment step. After the process reaches the equilibrium stage, no further solvent is required.

The solvent employable for this purpose includes aliphatic alcohols and halogenated or non-halogenated hydrocarbons,, which have a boiling point of not lower than about 60° C., preferably about 60 to about 300° C., more preferably about 60 to about 200° C. Desirable halogenated hydrocarbons are those of $C_1$ to $C_2$, which may contain higher-carbon-atom components; desirable non-halogenated hydrocarbons are those of $C_7$ to $C_8$, which may contain higher-carbon-atom components, and desirable aliphatic alcohols are those of $C_1$ to $C_4$. Typical examples of the solvents are heptane, heptene, octane, octene, cyclo-octene, nonane, cyclo-octane decane, kerosene, benzene, toluene, n-butyl chloride, n-butyl bromide, i-butyl iodide, ethylene dichloride, ethylene dibromide, monochlorobenzene, dichlorobenzene, methanol, ethanol, n-propanol, i-propanol, n-butanol, etc.

The present method is further illustrated referring to the accompanying drawing.

In the accompanying drawing, J is a water-scrubber, W is water to be charged to J, R is a gaseous reaction mixture which is obtained by water treatment of the reaction mixture from the Reactor, S is isobutylene gas recovered, I is isoprene recovered, H is formaldehyde-containing water, A and D are a distillation column, C is a cooler, E is a condenser, B and F are each a reboiler, U is a solvent and G is a separator, P is a blower or compressor.

Isobutylene and formaldehyde are reacted with each other in the reactor in a conventional manner; the reaction mixture is charged to the water scrubber J from the bottom, while water is charged to the scrubber from the top, whereby formaldehyde and a part of an oily substance contained in the reaction mixture are condensed in water; a gaseous substance R is taken from the top of the scrubber, while water containing formaldehyde and the oily substance is taken from the bottom; the gaseous substance R is charged to the distillation column A through the blower or compressor P, if desired, the bottom of the column being heated, while the top of the column is cooled by a cooler C; the substance taken from the bottom of the scrubber J is introduced into the separator G, wherein the oily substance is separated from an aqueous layer containing formaldehyde, the latter being introduced to a formaldehyde collector (not illustrated), while the former is introduced into the cooler C, wherein the oily substance K is cooled and contacted with the gas taken from the top of the column J; the cooled oily substance goes downwards the column A, while a gaseous material R goes upwards the same to contact with each other, whereby isobutylene is separated from isoprene; the separated isobutylene is taken from the top of the column A, cooled in the cooler C and taken out as gaseous isobutylene S; a mixture L of isoprene and the oily substance is taken out of the bottom of the column A and introduced into the distillation column D, while a part of the mixture is recycled and heated through the reboiler B; in the distillation column D, isoprene is separated from the oily substance; the separated isoprene is recovered from the top of the column D as a liquid substance I and the oily substance is taken out of the bottom of the column D, during which time a part of isoprene is recycled through the condensor E and a part of the oily substance is recycled through the reboiler F; the oily substance thus taken out is charged to the top of the column A through the cooler C; at the initial stage of these process steps, the solvent U may be charged to the top of the column A through the cooler C.

For inhibiting polymerization of isoprene, a suitable polymerization inhibitor may be incorporated into the oily substance.

According to the method described in detail as above, isoprene can be separated and recovered in a high yield from a reaction mixture of isobutylene and formaldehyde by means of distillation by a simple procedure and simple apparatus without requiring highly elevated pressure or without cooling the system to a low temperature, and furthermore, the by-product, the oily substance, can effectively be utilized.

EXAMPLE 1

800 ml. of calcium phosphate supported on silica-gel (1 mmol/g.) is charged in a tubular fixed bed reactor. Aqueous formaldehyde solution (20 weight percent) and isobutylene are passed through the reactor under such conditions that temperature is 300° C., pressure is normal to 2 kg./cm.$^2$G, a ratio of isobutylene/formaldehyde is 5 to 15 mole/mole, and space velocity is 40 to 120 mol/liter·hour. The reaction and the regeneration of the catalyst are repeated ten several times. An oily substance is separated from the resulting gaseous product.

The oily substance comprises 30 weight percent of $C_8$ unsaturated hydrocarbons, 40 weight percent of $C_9$ unsaturated hydrocarbons, 40 weight percent of $C_9$ unsaturated hydrocarbons and 30 weight percent of other substances. By the use of thus obtained oily substance, the following process is conducted.

Into a tubular fixed bed reactor packed with 20 ml. of the above mentioned catalyst are passed isobutylene and 20 weight percent aqueous formaldehyde solution at a rate of 45 g./hr. and 18 g./hr., respectively, at 300° C. under pressure of 0.1 kg./cm.$^2$G. The resultant is treated according to the flow sheet as per attached. Namely, the resulting gaseous product is passed through a water scrubber J to remove unreacted formaldehyde and a part of by-produced oily substance. The resultant R is then fed to the column A and the bottom substance L of the column A is further fed to the column D. The oily substance obtained above is charged to the column A through the cooler C as the make-up solvent. The bottom substance K of the column D is recycled to the column A through the cooler C. The oily substance recovered in the separator G is also recycled to the column A through the cooler C.

An amount of the oily substance to be charged is to adjusted that the total feed rate is 60 g./hr.

The columns A and D are glass column packed with 1/8" Dixon Packing (diameter: 17 mm., height: 1 m.). The column A is kept at 26° C. at the top and at 105° C. at the bottom, and the column D is kept at 34° C. at the top and at 115° C. at the bottom. The columns A and D are operated under normal pressure.

The above series of processes are conducted continuously for 4 hours. The average material balance in the column A of the 4 hour process is as follows.

| Material | Grams/hour | | | |
|---|---|---|---|---|
| | Product gas R | Oil fed K | Isobutylene recovered S | Bottom liquid L |
| Isobutylene | 42.0 | | 41.97 | 0.03 |
| Isoprene | 2.7 | | 0.02 | 2.68 |
| Oil | 0.5 | 60.0 | 1.4 | 59.10 |

EXAMPLE 2

Silica-gel is immersed into an aqueous hydrochloric acid solution of antimony trichloride, dried and calcinated, whereby antimony oxide supported on silica-gel (content of antimony oxide of 8 weight percent) is obtained.

Into a tubular reactor packed with 800 ml. of the above prepared catalyst are passed isobutylene and a 20 weight percent aqueous formalin solution under such conditions that a ratio of isobutylene/formaldehyde is 7/1 (mole/mole), space velocity is 70 mil/liter·hour, temperature is 310° C. and pressure is 0.5 kg./cm.$^2$G. The resultant is treated according to the flow sheet as per attached. Namely, the resulting gaseous product is passed through a water scrubber J to remove unreacted formaldehyde and a part of by-produced oily substance. The resultant R is then fed to the column A and the bottom substance L of the column A is further fed to the column D. The bottom substance K of the column D is recycled to the column A through the cooler C. The oily substance recovered in the separator G is also recycled to the column A through the cooler C. As substantially no oily substance to be contacted with te gaseous product R in the column A is produced at the start-up stage, iso-octane is charged to the column A through the cooler C as the make-up solvent U at the start-up stage. And, as the time goes, the oily substance is produced and accumulated and thus the total amount of the substance to be contacted with the gaseous product R in the column A (namely a mixture of the oily substance and iso-octane) is increased. Therefore, excess of the substance is taken out of the system. After the process becomes an equilbrium state, the substance contacted with the product R contains the following components; 40 weight percent of $C_8$ hydrocarbons, 30 weight percent of $C_9$ unsaturated hydrocarbons and 30 weight percent of $C_{10}$ unsaturated hydrocarbons and others. The above mentioned series of processes are conducted continuously for 6 hours under the conditions as described below;

Column A:
    diameter of 40 mm., height of 3 m., packed with 1/4" Dixon Packing
    column pressure of 0.8 kg./cm.$^2$ G
    column top temperature of 25° C., column bottom temperature of 115° C.

Column D:
   diameter of 40 mm., height of 2 m., packed with ¼" Dixon Packing
   column pressure of normal pressure
   column top temperature of 34° C., column bottom temperature of 120° C.
Feed rate of the gaseous product R: 2000 g./hr.
Feed rate of the substance to be contacted with the product R: 1500 g./hr.

By the above series of processes, isoprene of purity of 98.5% is obtained at a recovery yield of 97%, and the recovered isobutylene contains only 0.1 mole percent or less of isoprene.

EXAMPLE 3

Silica-gel is immersed in an aqueous solution of ferric chloride, treated with ammonia, dried and calcinated, whereby ferric phosphate supported on silica-gel (content of ferric phosphate of 20 weight percent) is obtained.

By using thus prepared catalyst, a similar process to the Example 2 is conducted under the following conditions:

Reaction temperature: 300° C.
Reaction pressure: 0.9 kg./cm.²G
Molar ratio of isobutylene/formaldehyde: 4/1
Space velocity: 80 mol/liter·hour Components of the substance to be contacted with the product R after equilibrium state: 40 weight percent of $C_8$ hydrocarbons, 35 weight percent of $C_9$ unsaturated hydrocarbons and 25 weight percent of $C_{10}$ unsaturated hydrocarbons and others Column A:
   column pressure of 1.2 kg./cm.²G
      column pressure of 1.2 kg. cm.²G
      column top temperature of 30° C., column bottom temperature of 140° C.

Column D:
   column pressure of 0.3 kg./cm.²G
   column top temperature of 40° C., column bottom temperature of 120° C.
Feed rate of the gaseous product R: 2200 g./hr.
Feed rate of the substance to be contacted with the product R: 1500 g./hr.

By the above series of processes, isoprene of purity of 98.5% is obtained in a recovery yield of 96%, and the recovered isobutylene contains only 0.05% of isoprene.

EXAMPLE 4

Silica-gel is immersed in phosphoric acid, dried and calcinated, whereby phosphoric acid supported on silica-gel (content of phosphoric acid of 10 weight percent) is obtained.

By using thus prepared catalyst, a similar process to the Example 2 is conducted under the following conditions:

Reaction temperature: 300° C.
Reaction pressure: 0.5 kg./cm.²G.
Molar ratio of isobutylene/formaldehyde: 20/1.
Space velocity: 100 mol/liter·hour.

Components of the substance to be contacted with the product R after equilibrium state: 60 weight percent of $C_8$ hydrocarbons, 25 weight percent of $C_9$ unsaturated hydrocarbons and 15 weight percent of $C_{10}$ unsaturated hydrocarbons and others.

Column A:
   column pressure of 2 kg./cm.²G
   column top temperature of 30° C., column bottom temperature of 170° C.

Column D:
   column pressure of 0.3 kg./cm.²G
   column top temperature of 40° C., column bottom temperature of 120° C.

Feed rate of the gaseous product R: 2500 g./hr.
Feed rate of the substance to be contacted with the product R: 1300 g./hr.

By the above series of processes, isoprene of purity of 98% is obtained in a recovery yield of 94%, and the recovered isobutylene contains only 0.05% or less of isoprene.

What we claim is:

1. A method for the separation and recovery of isoprene from a reaction mixture obtained by reacting an excess of isobutylene with formaldehyde at about 200–400° C. in the presence of a solid acid catalyst, which comprises (1) contacting the reaction mixture with water, whereby formaldehyde and a portion of the oily substance by-produced during the reaction are removed from the reaction mixture, (2) separating said oily substance from the mixture of formaldehyde and oily substance, (3) contacting the resultant reaction mixture obtained in (1) with said separated oily substance in a first distillation column having a column top temperature not higher than about 50° C. and a column bottom temperature not lower than about 80° C. to remove unreacted isobutylene and (4) subjecting the resultant mixture of isoprene and oily substance to distillation in a second column, whereby isoprene is recovered as distillate.

2. The method according to claim 1, wherein (1) the reaction mixture is contacted with water, (2) a solution resulting from (1) is separated into an oily layer and an aqueous layer and the oily layer is recovered, (3) the resultant reaction mixture obtained in (1), the oily substance recovered in (2) and the oily substance recycled from (5) are contacted with each other in a distillation column having a column top temperature not higher than about 50° C. and a column bottom temperature not lower than about 80° C., whereby isobutylene is reovered as a gaseous state from the top of the column, (4) the material obtained from the bottom of the column in (3) is subjected to distillation, whereby isoprene is recovered as a distillate and (5) the material obtained from the bottom of the column in (4) is recycled to the column (3).

3. The method according to claim 2, wherein the weight ratio of the oily substance to the resulting reaction mixture obtained after contact with water is about 1/10 to about 3/1.

4. The method according to claim 1, wherein the weight ratio of the oily substance to the resulting reaction mixture obtained after contact with water is about 1/10 to about 3/1.

5. The method according to claim 1, wherein the material obtained from the bottom of the second distillation column is recycled to the top of the first distillation column.

6. The method according to claim 1, wherein the oily substance has a boiling point of about 90 to about 200° C., a specific gravity of about 0.75 to about 0.85 at 25° C., and contains about 5 to about 80 weight percent of $C_8$ unsaturated hydrocarbons, about 5 to about 80 weight percent of $C_9$ unsaturated hydrocarbons and about 0 to about 50 weight percent of $C_{10}$ unsaturated hydrocarbons.

7. The method according to claim 1, wherein an aliphatic alcohol, halogenated hydrocarbon or non-halogenated hydrocarbon having a boiling point of about 60 to about 300° C. is introduced into the first distillation column and contacted with the resultant reaction mixture therein.

8. A method for the separation and recovery of isoprene from a reaction mixture obtained by reacting an excess of isobutylene with formaldehyde at about 200 to 400° C. in the presence of a solid acid catalyst, which comprises (1) charging the reaction mixture to a water scrubber, whereby formaldehyde is removed as an aqueous solution, (2) charging the resulting gaseous reaction mixture to a first distillation column wherein distillation is conducted and contacting the gaseous reaction mixture with the high boilers recycled from (4) and introduced into the top of said first column, (3) removing high boilers from the bottom of the first column and charging said high boilers to a second distillation column whrein distillation is conducted, and (4) recycling the high boilers taken from the bottom of the second column through a cooler to the top of the first column, gaseous isobutylene being recovered from the top of the first column and isoprene being recovered from the top of the second column.

9. The method according to claim 8 wherein the top of the first column is maintained at a temperature not higher than about 50° C. and the bottom of the first column is maintained at a temperature not lower than about 80° C.

References Cited
UNITED STATES PATENTS

| | | | |
|---|---|---|---|
| 2,365,912 | 12/1944 | Souders | 203—52 |
| 2,513,252 | 6/1950 | Robertson | 203—52 |
| 3,146,278 | 8/1964 | Habeshaw et al. | 260—681 |
| 3,437,711 | 4/1969 | Yanagita et al. | 260—681 |
| 3,235,619 | 2/1966 | Wirth | 260—681 |

PAUL M. COUGHLAN, JR., Primary Examiner

U.S. Cl. X.R.

203—52; 260—681